(No Model.)
J. FINSTERER.
CHAMBER POT AND COVER.
No. 283,588. Patented Aug. 21, 1883.
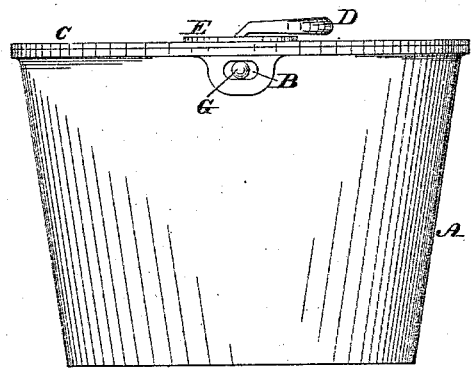
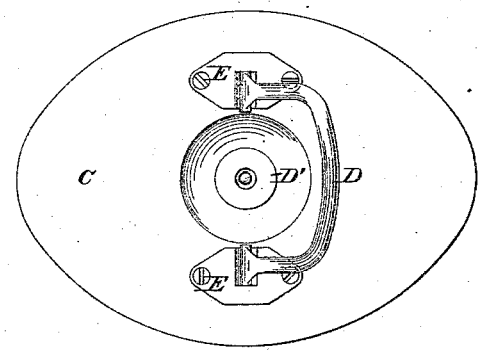
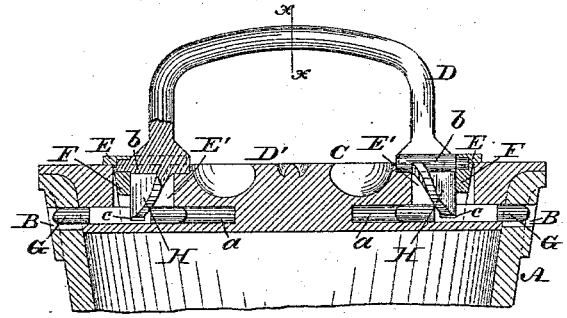
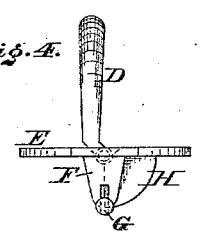
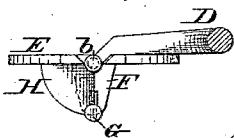
WITNESSES:
W. F. Kirches
L. Douville
INVENTOR:
John Finsterer
BY John A. Diedersheim
ATTORNEY.

UNITED STATES PATENT OFFICE.

JOHN FINSTERER, OF PHILADELPHIA, PENNSYLVANIA.

CHAMBER-POT AND COVER.

SPECIFICATION forming part of Letters Patent No. 283,588, dated August 21, 1883.

Application filed December 6, 1882. (No model.)

*To all whom it may concern:*

Be it known that I, JOHN FINSTERER, a citizen of the United States, residing in the city and county of Philadelphia, State of Pennsylvania, have invented a new and useful Improvement in Chamber-Pots and Covers, which improvement is fully set forth in the following specification and accompanying drawings, in which—

Figure 1 is a side elevation of the chamber-pot and cover embodying my invention. Fig. 2 is a top or plan view thereof. Fig. 3 is a vertical section, enlarged, of a portion thereof. Fig. 4 is a side elevation of a detached portion, the handle being raised. Fig. 5 is a view of the portion on the right hand of the sectional line *x x*, Fig. 3, the handle being down or folded.

My invention relates to improvements in a chamber-pot having a cover which may be locked in position on the pot, so that the latter is tightly closed and may be carried by the handle of the cover; and it consists in a chamber-pot provided with openings, in combination with a cover having lateral guideways, bolts sliding in said guideways and adapted to enter said openings, and a pivoted handle having parts or attachments which shoot said bolts into said holes when said handle is raised.

It also consists in a pot-cover having a pivoted handle and sliding bolts, in combination with spiral lugs connected with said handle and operating against said bolts, substantially as hereinafter set forth.

Referring to the drawings, A represents a chamber-pot, which is formed of suitable material, and has on each side, at opposite places, an opening, B.

C represents the cover of the pot, and D the handle thereof, the latter being pivoted to ears E, which are secured to the top of the cover on opposite sides, the cover having openings E' below said ears.

Depending from each ear E is a vertical slotted or guiding piece, F, to which is fitted a pin or bolt, G, which is arranged horizontally and transversely, and passed through an opening, *a*, in the side of the lid or cover C, the two bolts being adapted to enter the openings B of the pot.

Depending from the pintle portion *b* of each end of the handle D is a spiral lug, H, which is fitted in a notch or groove, *c*, on the upper part of the bolt G, it being noticed that the pitch of the two spiral lugs H is in opposite directions, whereby both bolts G are simultaneously operated, their outward motion causing them to enter the openings B of the pot, and their inward motion withdrawing them from said openings. The lugs H are secured to or formed with the pintle portions *b*, and the guide-pieces F are secured to or formed with the ears E, it being evident that casting is preferred, and the portions of the bolts G which play in the vertical slots of the pieces F are flattened on their sides and embraced by the walls of said slots, whereby the bolts are prevented from rotation when operated by the spiral lugs H.

The cover is placed on the pot and the handle D raised, the operation of the latter causing the connected spiral lugs H to shoot the bolts G outwardly, and thus into the openings B of the pot, whereby, by means of said handle D of the cover, as the connected bolts G engage with the top walls of the openings B, the pot may be carried to any desired spot, the cover tightly closing the top of the pot, and preventing the escape of the odor, it being noticed that the sides of the portion of the cover which enters the pot close the openings B, so that the latter do not provide an outlet for the odor. When the pot is to be opened, the handle D is lowered on the cover, whereby the bolts are withdrawn from the openings B by the rotation of the spiral lugs H, and entirely clear the walls of said openings. The cover C may now be lifted by means of its knob D', and the interior of the pot is accessible for discharging and cleansing purposes, it being noticed that the path of motion of the pivotal handle is always at a right angle to that of the sliding bolts.

The openings B do not obstruct the interior of the pot, and are, furthermore, oblong or elongated in the horizontal direction, so that if the cover does not sit true in position the ends of the bolts are unfailingly directed into some part of the openings without liability to strike the walls of the same and fracture the pot, the latter being preferably made of glass, although it may be made of porcelain, crockery, or other suitable material.

Having thus described my invention, what I claim as new, and desire to secure by Letters Patent, is—

1. A chamber-pot provided with openings, in combination with a cover having lateral guideways, bolts sliding in said guideways, and adapted to enter said openings, and a pivoted handle having parts or attachments which shoot said bolts into said holes when said handle is raised, for the purpose set forth.

2. A pot-cover having a pivoted handle and sliding bolts, in combination with spiral lugs connected with said handle, and operating against said bolts, substantially as set forth.

JOHN FINSTERER.

Witnesses:
  JOHN A. WIEDERSHEIM,
  C. B. MENGER.